United States Patent [19]

Harris

[11] Patent Number: 4,803,889

[45] Date of Patent: Feb. 14, 1989

[54] FUEL INJECTION PUMP

[75] Inventor: Kenneth M. Harris, Maidstone, England

[73] Assignee: Lucas Industries Public Limited Company, Birmingham, England

[21] Appl. No.: 64,825

[22] Filed: Jun. 19, 1987

[30] Foreign Application Priority Data

Jul. 11, 1986 [GB] United Kingdom ................. 8616964
Oct. 22, 1986 [GB] United Kingdom ................. 8625330

[51] Int. Cl.[4] ................................................ F16H 53/00

[52] U.S. Cl. ............................................ 74/53; 74/54; 74/568 R; 74/569

[58] Field of Search ...................... 74/569, 568 R, 829, 74/53, 54

[56] References Cited

U.S. PATENT DOCUMENTS

| | | | |
|---|---|---|---|
| 999,321 | 8/1911 | Leach | 74/569 |
| 1,733,240 | 10/1929 | Saives | 74/569 |
| 1,918,910 | 7/1933 | Hilgeland | 74/569 |
| 2,131,508 | 9/1938 | Goodwin | 123/90 |
| 2,667,079 | 1/1954 | Müller | 74/55 |
| 3,738,180 | 6/1973 | Sola | 74/53 |
| 3,878,822 | 4/1975 | Beal | 123/90.16 |
| 4,348,917 | 9/1982 | Gardner et al. | 74/568 R |
| 4,535,641 | 8/1985 | Kriz et al. | 74/53 |

FOREIGN PATENT DOCUMENTS

| | | | |
|---|---|---|---|
| 233417 | 10/1944 | Switzerland | 74/569 |
| 2101230 | 1/1983 | United Kingdom . | |

*Primary Examiner*—Dirk Wright
*Assistant Examiner*—Scott Anchell
*Attorney, Agent, or Firm*—Balogh, Osann, Kramer, Dvorak, Genova & Traub

[57] ABSTRACT

An injection pump for supplying fuel to an internal combustion engine includes a plunger coupled to a cam follower which can be moved in one direction to effect fuel delivery by a multi lobed cam. The plunger is returned following fuel delivery by a return mechanism including two levers one of which carries a roller engaging the cam and the other of which engages the plunger. An adjustment shoe is carried by the one lever and is engaged by the other lever to enable adjustment of the backlash in the mechanism.

4 Claims, 1 Drawing Sheet

FUEL INJECTION PUMP

This invention relates to a fuel injection pump for supplying fuel to an internal combustion engine and of the kind comprising a pumping plunger which is positively reciprocated by a cam mechanism of the desmodromic type, the mechanism comprising a first cam follower located at one end of the plunger, the cam follower being engageable by a cam lobe on a rotary cam to impart inward movement to the plunger in a direction to pump fuel, a second cam follower engageable with a cam lobe, said second cam follower being mounted at one end of a first pivotal lever, the other end of the first pivotal lever being mounted on a housing of the pump, a second pivotal lever pivotally mounted intermediate its ends on said housing, one end of said second pivotal lever engaging with said plunger and the other end of the second pivotal lever being operatively coupled to said first pivotal lever, so that movement of the second cam follower by the cam lobe will cause pivotal movement of the levers and outward movement of the plunger.

A fuel injection pump of the kind set forth is shown in FIG. 4 of British patent specification No. 2101230A.

In the construction of such a pump it is most important to ensure that the mechanism is correctly adjusted otherwise there may be excessive backlash which will upset the delivery characteristics of the pump, on the other hand if there is no backlash undesirable forces may be generated in the cam mechanism during rotation of the cam.

According to the invention a pump of the kind specified is characterized by adjustment means carried by one of said levers and engaging with the other of said levers whereby the backlash in the mechanism can be adjusted.

In the accompanying drawings:-

Figure 1:
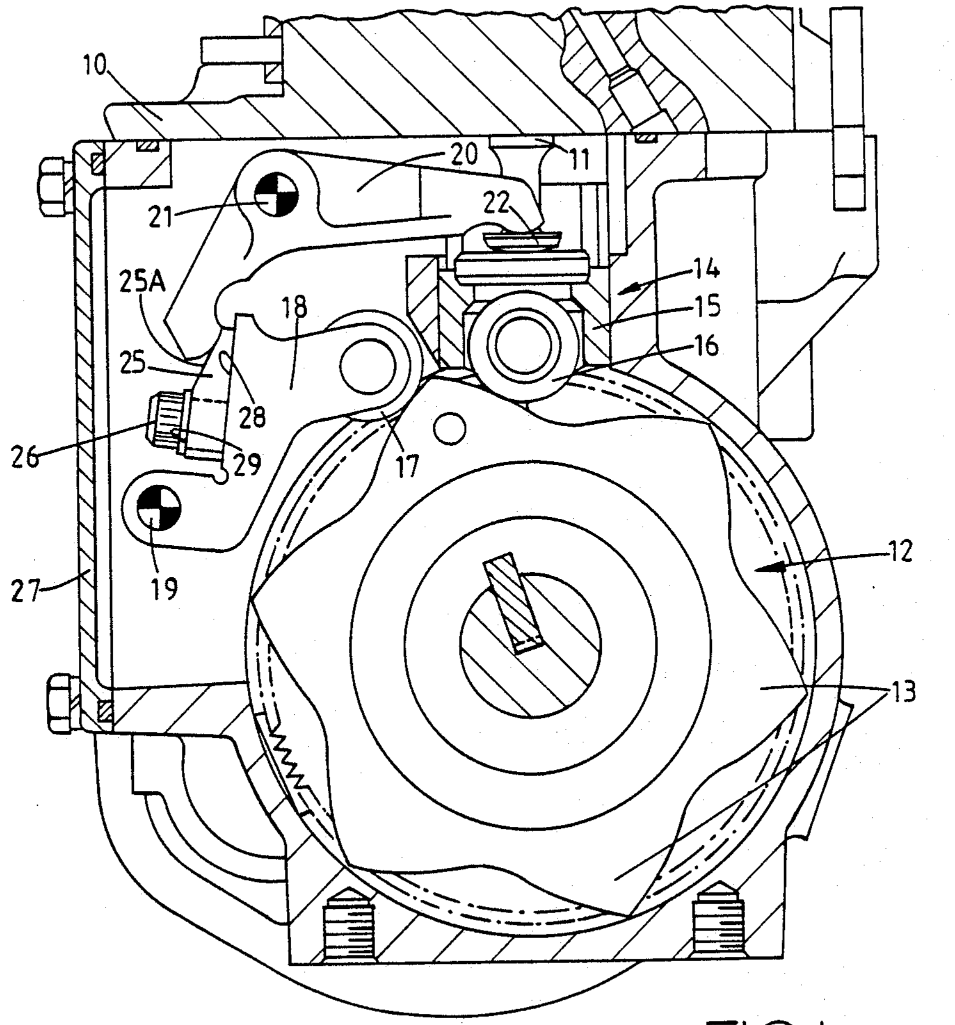
FIG. 1 is a side elevation of part of a pump.

Referring to FIG. 1 of the drawings, the pump comprising a housing 10 and a pumping plunger 11 which is housed within a bore defined in a part carried by the housing. Communicating with the inner end of the bore is a fuel outlet which may be connected to a fuel distribution member whereby fuel is delivered in turn during successive inward strokes of the pumping plunger to the combustion space of an engine.

Mounted within the housing is a rotary cam 12 which is driven in timed relationship with the associated engine, the cam having cam lobes 13 of which in the particular example, there are six in number.

Slidable within the housing is a first cam follower 14 which comprises a tappet 15 carrying a roller 16 engageable with the periphery of the cam. The tappet 15 engages the foot of the plunger 11 whereby as the cam 12 rotates, the tappet 15 will be moved by a cam lobe to urge the plunger 11 upwardly as shown in the drawing, such movement resulting in the displacement of fuel from the bore in which the plunger is mounted.

Also provided is a second cam follower in the form of a roller 17 which is mounted at one end of a first pivotal lever 18, the lever being mounted at its other end on a pivot 19 carried by the housing 10. In addition, a second pivotal lever 20 is provided this being pivotally mounted on a pivot pin 21 carried by the housing, intermediate its ends. One end of the lever 20 is bifurcated and engages the foot 22 of the plunger 11 while the other end of the lever 20 is shaped to engage with the lever 18 intermediate its ends. The arrangement is such that a cam lobe 13 engaging the roller 17 will pivot the lever 18 in the anticlockwise direction and this causes movement of the lever 20 in the clockwise direction to draw the plunger 11 downwardly as seen in the drawing. During rotation of the cam therefore the plunger is positively reciprocated.

As previously mentioned it is essential to prevent any appreciable backlash in the mechanism since this would upset the operating characteristics of the pump. At the same time it is necessary to ensure that during the operation of the pump undue stresses are not created in the levers and cam followers.

Various methods are available for effecting adjustment for example, it is possible to use the technique of selective assembly varying for example the size of the lever 20. As an alternative it is possible to provide the mechanism with an adjustable component. For example, the position of the pivot 21 can be altered by mounting it on an adjustable mounting.

Figure 2:
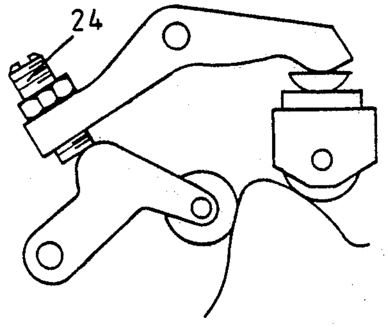
FIG. 2 is a view of part of the pump showing a modification.

It is preferred however to provide the adjustment at the contact position between the lever 20 and the lever 18. This can be achieved by mounting an adjusting screw 24 on the lever 20 as shown in Figure 2, the screw being provided with a locknut.

In a preferred arrangement however the adjusting screw 24 is replaced by a wedge shaped shoe 25 which is adjustably mounted on the lever 18. The shoe is secured to the lever by means of a bolt 26 and has an elongated slot through which the shank of the bolt is passed whereby the position of the shoe on the lever 18 can be adjusted to enable the backlash in the mechanism to be controlled.

It is particularly convenient to use the wedge shaped shoe because the co-operating surface 25A of the shoe and the surface of the lever 20 can be profiled to the desired shape to obtain the minimum variation in the point of contact between the shoe and lever. Moreover, the adjustment can be effected after assembly of the pump, the housing of the pump having a detachable access plate 27.

In the arrangement shown in FIG. 1 the axis of the bolt 26 extends substantially at right angles to the surface 28 of the lever 18 upon which the wedge shaped shoe is mounted. The surface 29 of the shoe engaged by the head of the bolt is therefore parallel to the surface 28 of the lever. In operation the reaction forces between the co-acting surfaces of the lever and shoe produce a force component extending parallel to said surface of the lever and the shoe can migrate along the lever so that the fine adjustment of the clearance of the mechanism is lost.

Figure 3:
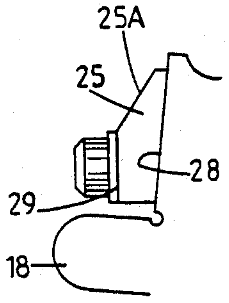
FIG. 3 is a view of a modification of part of the pump shown in FIG. 1.

In order to avoid this the surface 29 of the shoe which is engaged by the head of the bolt 26 is inclined to the surface 28 as shown in FIG. 3. In addition, the axis of the bolt 26 is inclined by the same amount. The practical effect is that if there is any movement of the shoe under the influence of the force component a wedge action is obtained to increase the clamping force.

I claim:

1. A fuel injection pump for supplying fuel to an internal combustion engine comprising a pumping plunger which is positively reciprocated by a cam mechanism of the desmodromic type, the mechanism comprising a first cam follower located at one end of the plunger, the cam follower being engageable by a cam lobe on a rotary multilobe cam to impart inward movement to the plunger in a direction to pump fuel, a second cam follower engageable with a cam lobe, said second cam follower being mounted at one end of a first pivotal lever, the other end of the first pivotal lever being mounted on a housing of the pump, a second pivotal lever being pivotally mounted intermediate its ends on said housing, one end of said second pivotal lever engaging with said plunger and the other end of the second pivotal lever being operatively coupled to said first pivotal lever, so that movement of the second cam follower by the cam lobe will cause pivotal movement of the levers and outward movement of the plunger, adjustment means carried by one of said levers and engaging with the other of said levers whereby the backlash in the mechanism can be adjusted, said adjustment means comprising a wedge-shaped shoe adjustably mounted on said first lever, a surface defined on said shoe for engagement by the second lever and a bolt engaging said shoe and said first lever for securing the shoe to the first lever, the bolt having a head which engages with a further surface defined by the shoe, said further surface of the shoe being inclined to a surface defined on said first lever and against which the shoe is secured by the screw, whereby lateral movement of said shoe relative to the surface defined on said first lever will be restrained by a wedge action.

2. An injection pump according to claim 1 characterised in that said adjustment means comprises a screw carried by said second lever, and a locknut engageable with said screw.

3. An injection pump according to claim 1 characterised in that said shoe is provided with a slot through which said bolt extends, said slot allowing for adjustment of the shoe.

4. An injection pump according to claim 1 in which the presented surfaces of the shoe and second lever are shaped to provide the minimum variation in the point of contact between the shoe and the second lever during the use of the pump.

* * * * *